(12) United States Patent
Ishii

(10) Patent No.: US 10,613,804 B2
(45) Date of Patent: Apr. 7, 2020

(54) PRINT SETTING PROCESS FOR A MEDIUM AND PRINTED-MATTER PRODUCING APPARATUS

(71) Applicant: Brother Kogyo Kabushiki Kaisha, Nagoya-shi, Aichi-ken (JP)

(72) Inventor: Hidekazu Ishii, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/144,216

(22) Filed: Sep. 27, 2018

(65) Prior Publication Data

US 2019/0163414 A1 May 30, 2019

(30) Foreign Application Priority Data

Nov. 30, 2017 (JP) .................................. 2017-229857

(51) Int. Cl.
*G06F 3/12* (2006.01)
*B41J 3/407* (2006.01)
*B41J 11/00* (2006.01)
*H04N 1/23* (2006.01)
*H04N 1/00* (2006.01)

(52) U.S. Cl.
CPC ............ *G06F 3/123* (2013.01); *B41J 3/4075* (2013.01); *B41J 11/009* (2013.01); *G06F 3/1204* (2013.01); *G06F 3/1255* (2013.01); *G06F 3/1258* (2013.01); *H04N 1/00482* (2013.01);

(Continued)

(58) Field of Classification Search
None
See application file for complete search history.

(56) References Cited

U.S. PATENT DOCUMENTS

2002/0085186 A1* 7/2002 Sawada .................. G03B 27/52
355/40
2005/0200875 A1* 9/2005 Sugimoto .............. B41J 11/009
358/1.13

(Continued)

FOREIGN PATENT DOCUMENTS

JP      2001-100966 A    4/2001
JP      2008-269265 A    11/2008

*Primary Examiner* — Miya J Williams
(74) *Attorney, Agent, or Firm* — Banner & Witcoff, Ltd.

(57) ABSTRACT

The disclosure discloses a non-transitory computer-readable medium storing a printed-matter producing program for executing steps on a controller of a printed-matter producing apparatus. In a consistency determination step, it is determined whether or not medium specification information acquired is identical to medium specification information stored in a medium specification information storage memory. In a medium specification information replacement step, the stored medium specification information is not replaced with the acquired medium specification information in the case that the acquired medium specification information is identical, and the stored medium specification information is replaced with the acquired medium specification information in the case that the acquired medium specification information is not identical. In a printed-matter production step, a feeder and a printing head is controlled on the basis of one piece of the medium specification information stored in the medium specification information storage memory to produce a printed matter.

7 Claims, 10 Drawing Sheets

(52) U.S. Cl.
CPC ......... *H04N 1/2323* (2013.01); *H04N 1/2353* (2013.01)

(56) References Cited

U.S. PATENT DOCUMENTS

| | | | |
|---|---|---|---|
| 2007/0013935 A1* | 1/2007 | Uchida | G06F 3/1204 358/1.13 |
| 2007/0030514 A1* | 2/2007 | Shima | G06F 3/1208 358/1.15 |
| 2008/0003034 A1* | 1/2008 | Ihara | G06F 21/608 400/62 |
| 2008/0259398 A1 | 10/2008 | Osuka et al. | |
| 2009/0230607 A1* | 9/2009 | Masui | B65H 7/20 271/8.1 |
| 2012/0183340 A1* | 7/2012 | Kanamoto | B41J 3/46 400/76 |
| 2012/0237245 A1* | 9/2012 | Mitsui | G03G 15/6585 399/69 |

\* cited by examiner

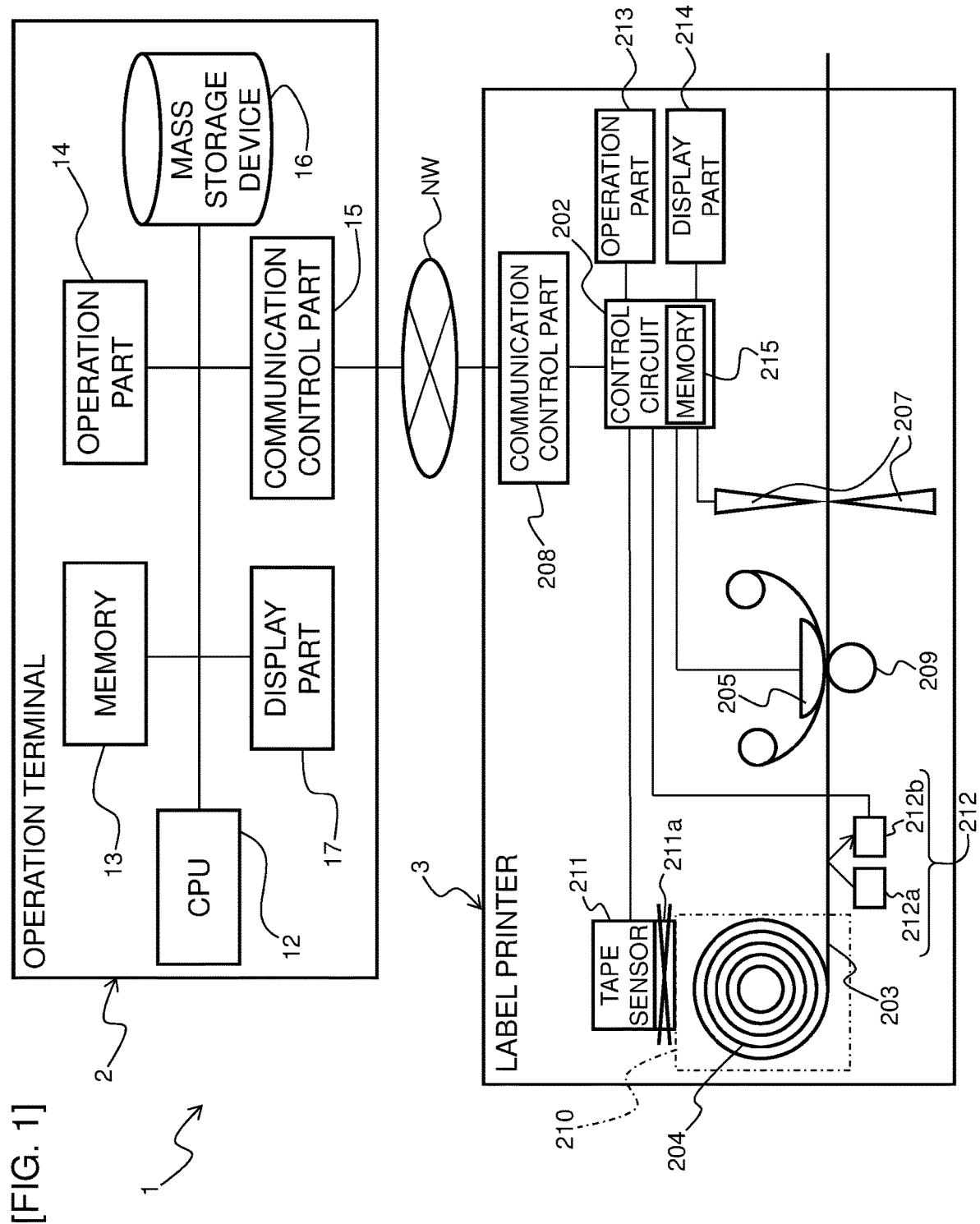
[FIG. 1]

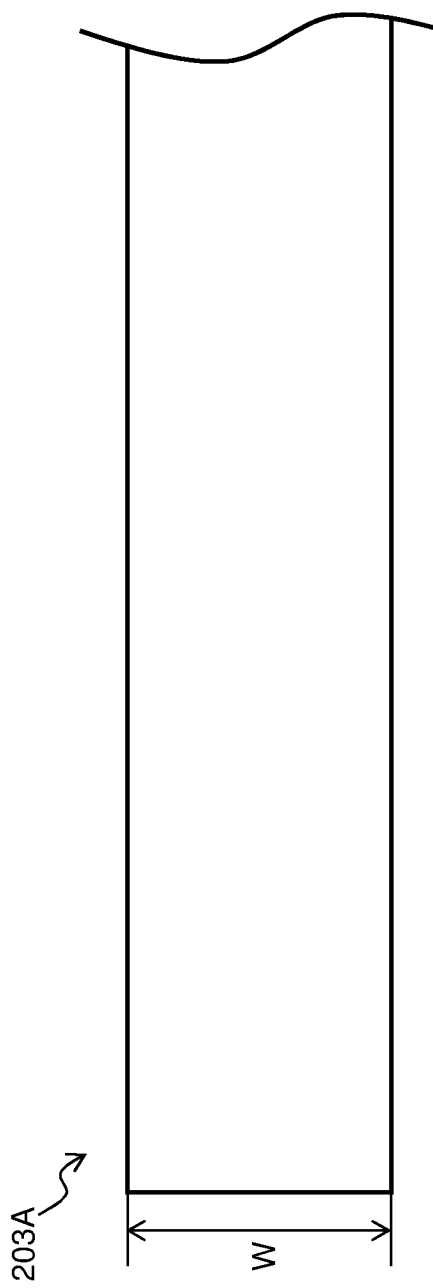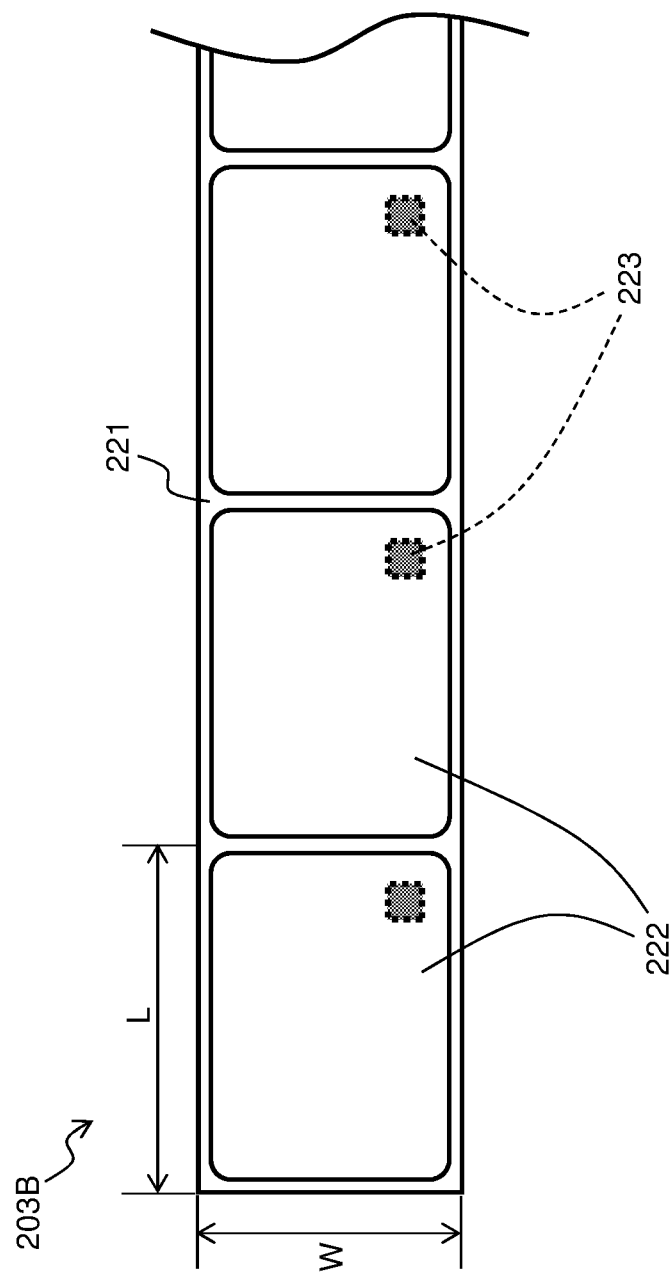

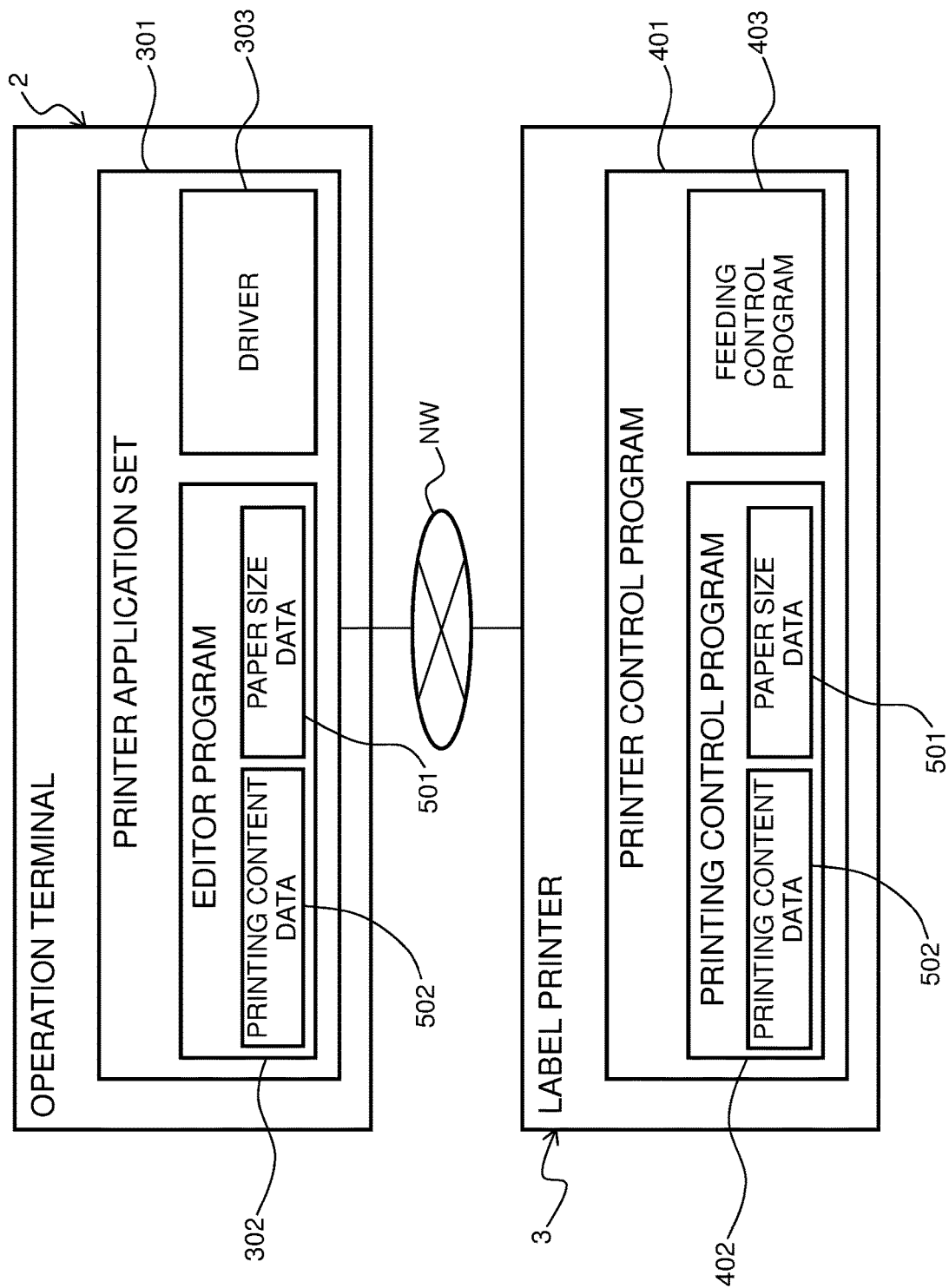
[FIG. 3]

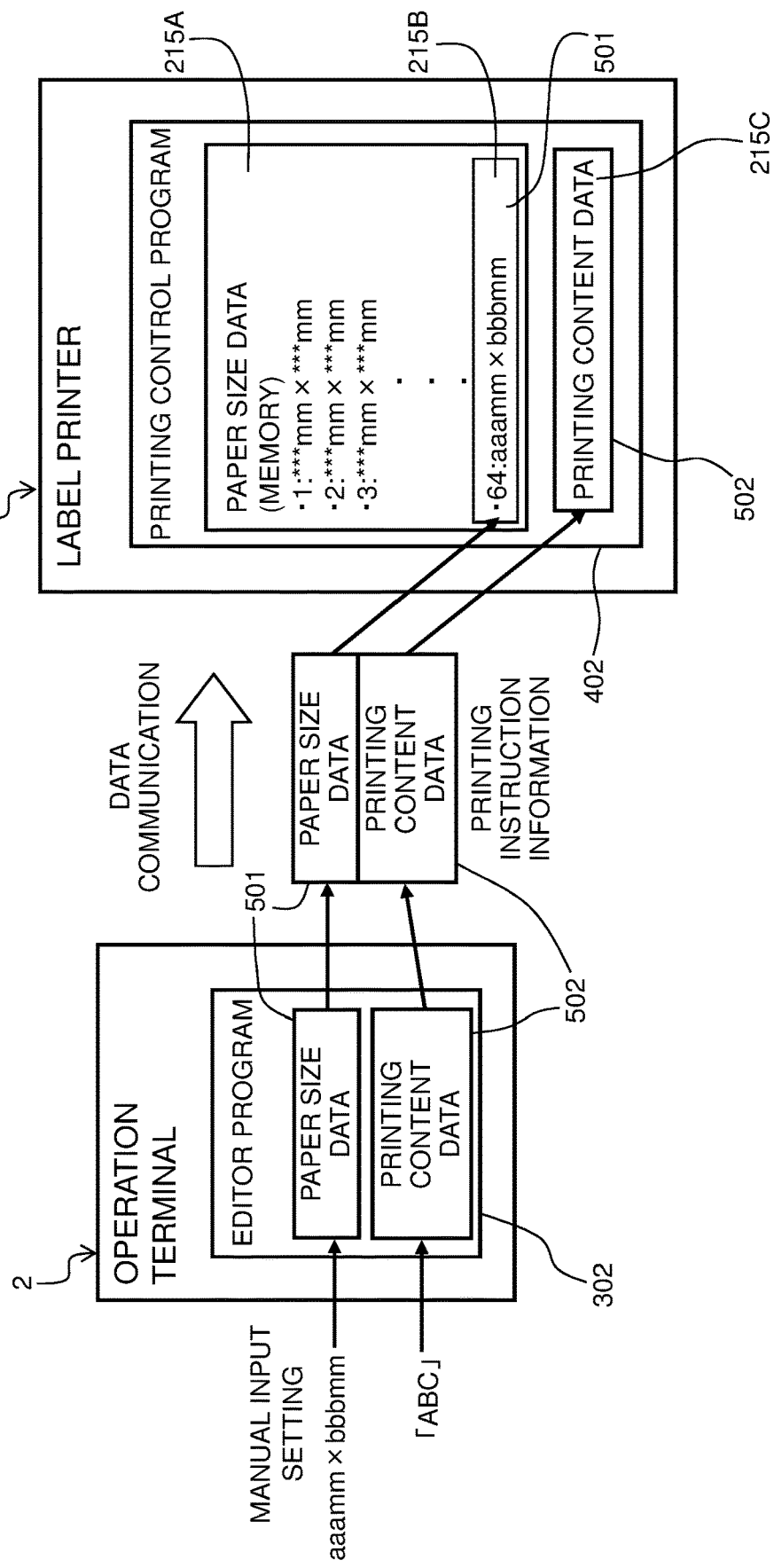

[FIG. 5]
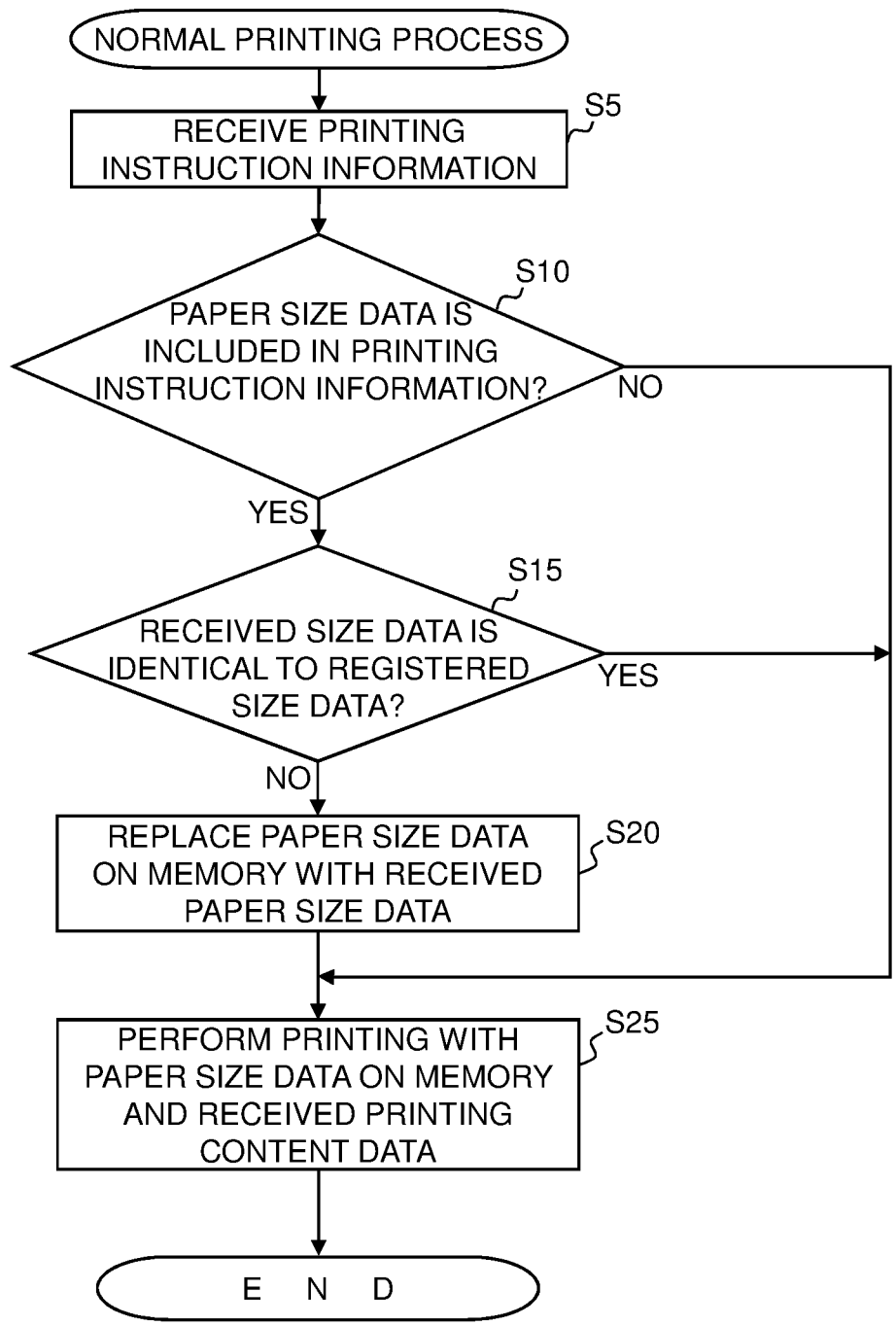

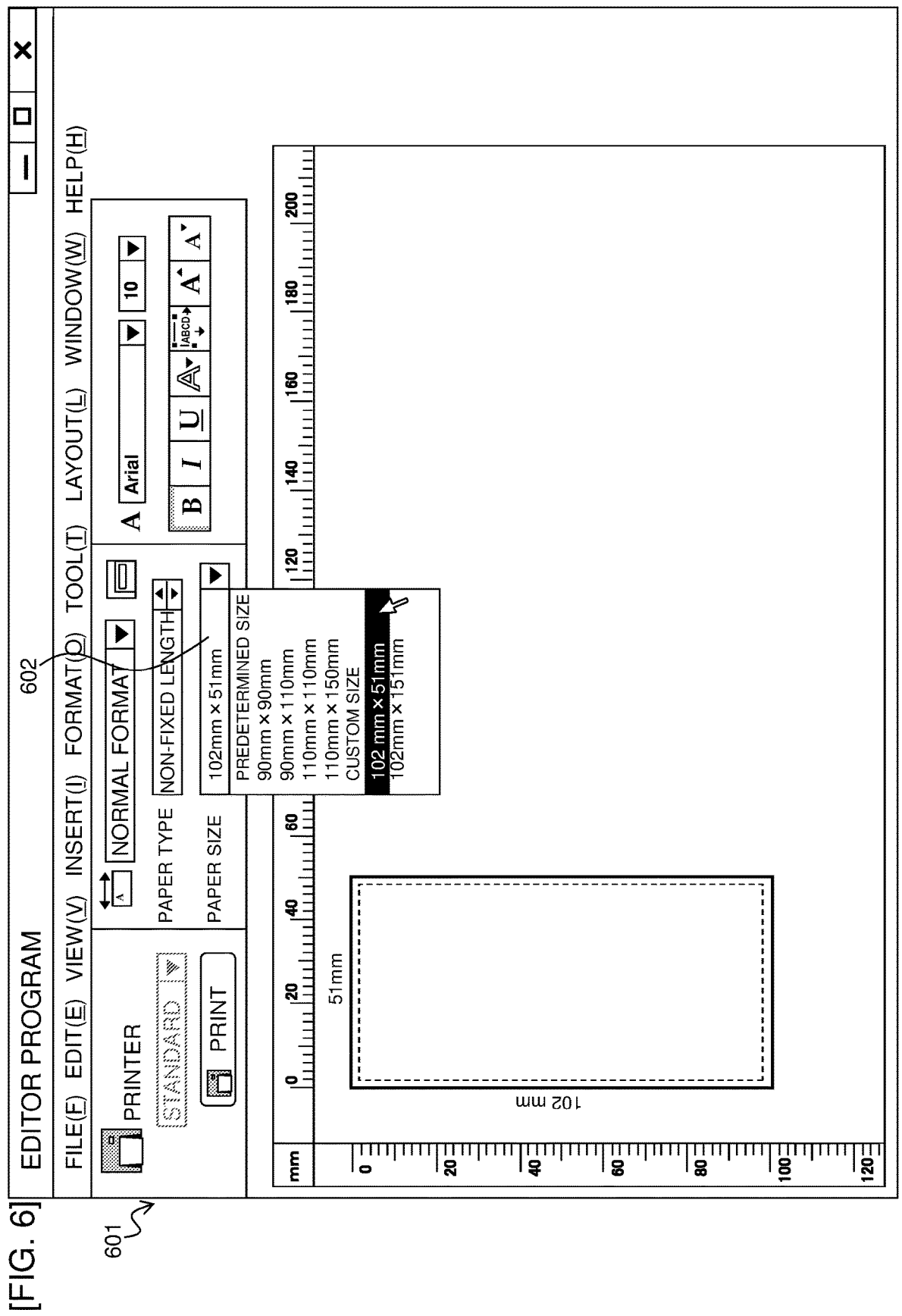
[FIG. 6]

[FIG. 7]
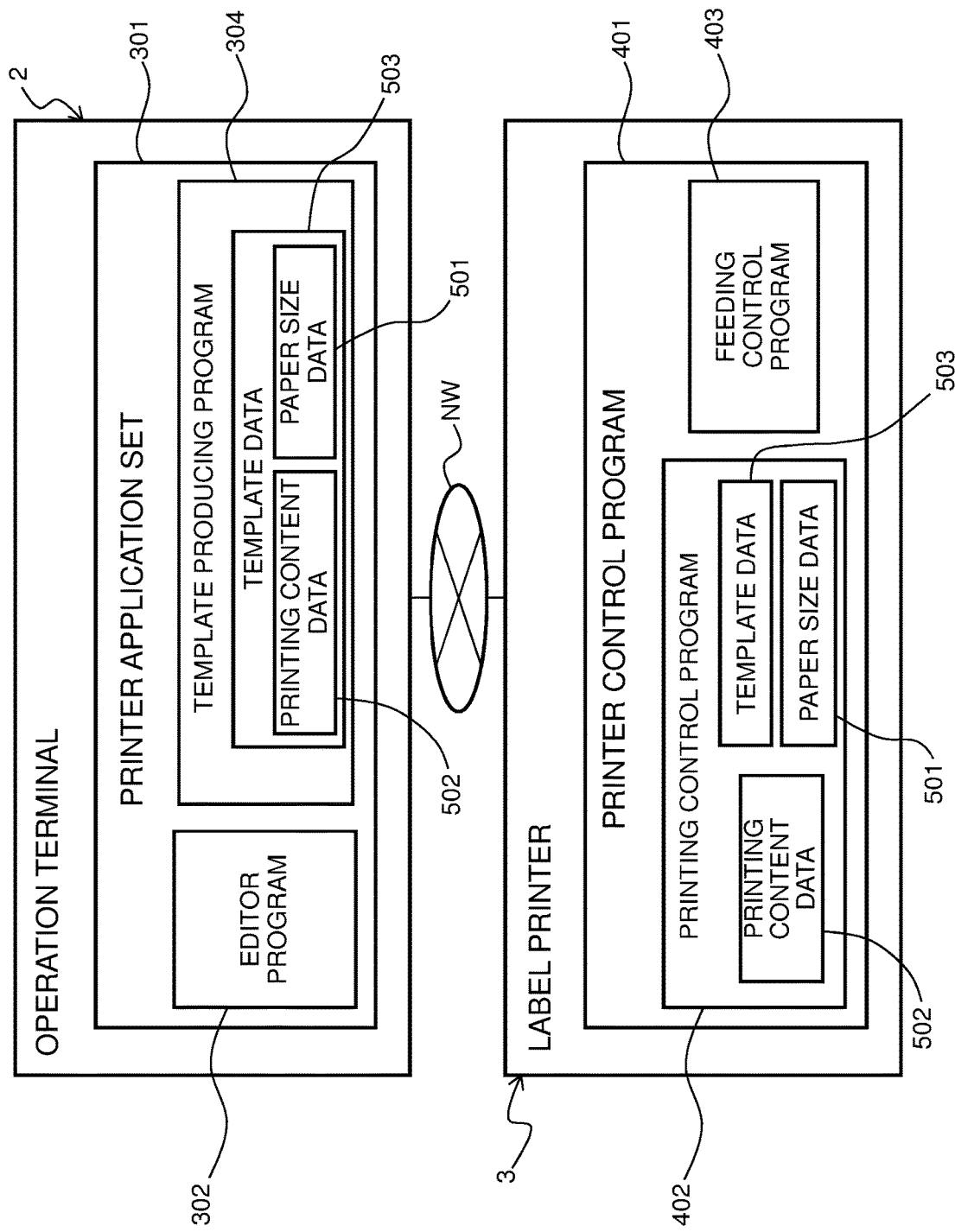

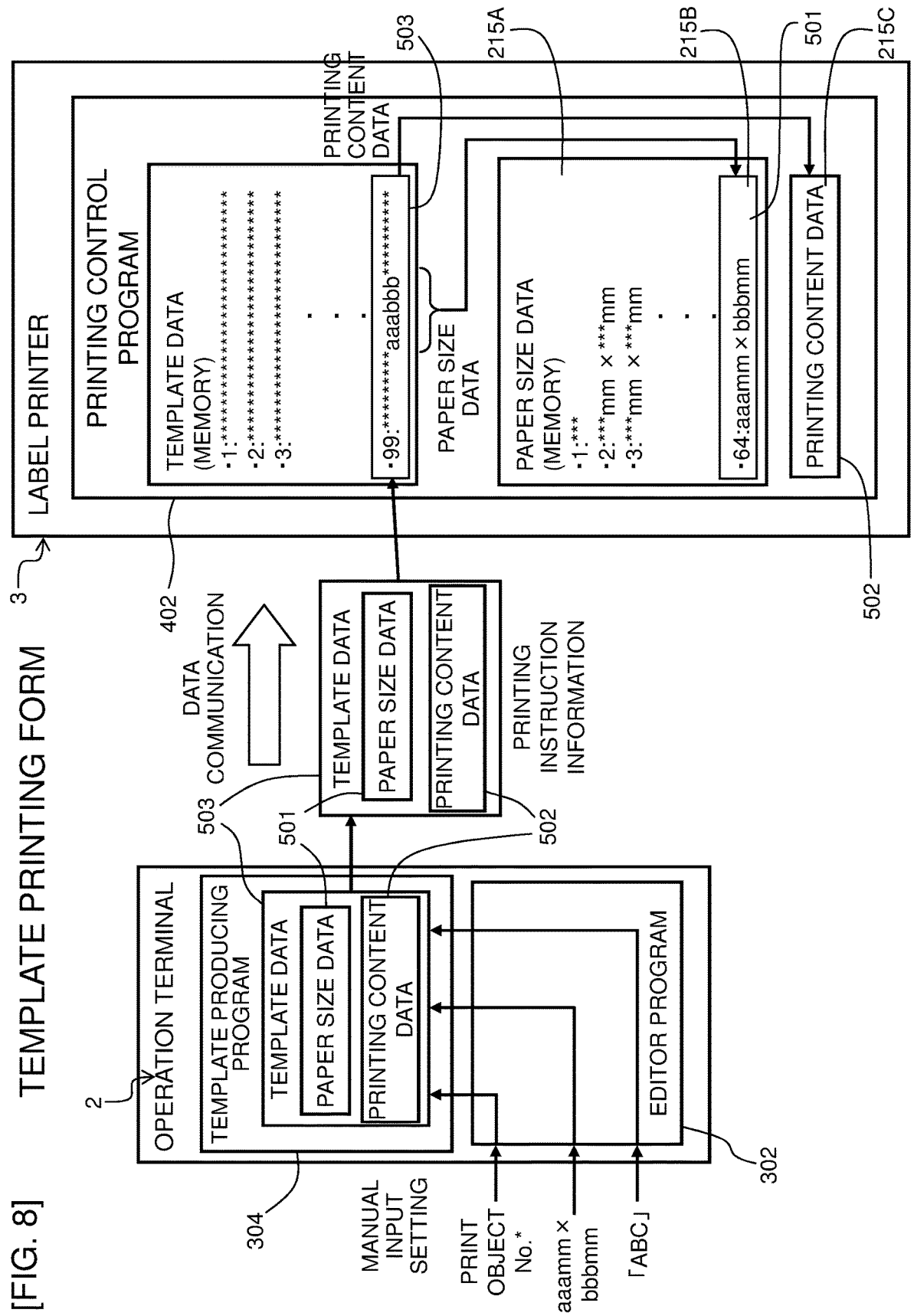

[FIG. 9]
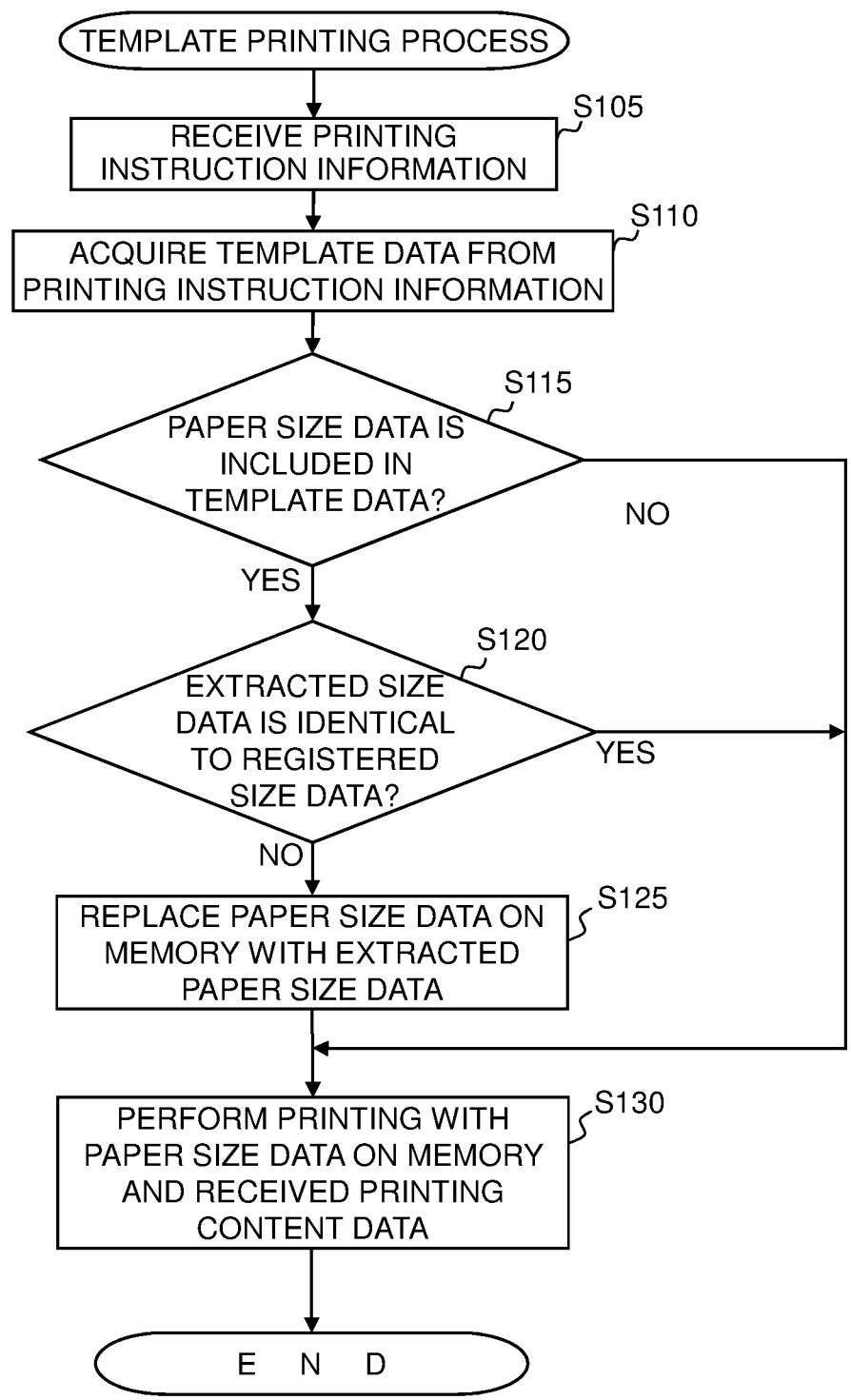

[FIG. 10]
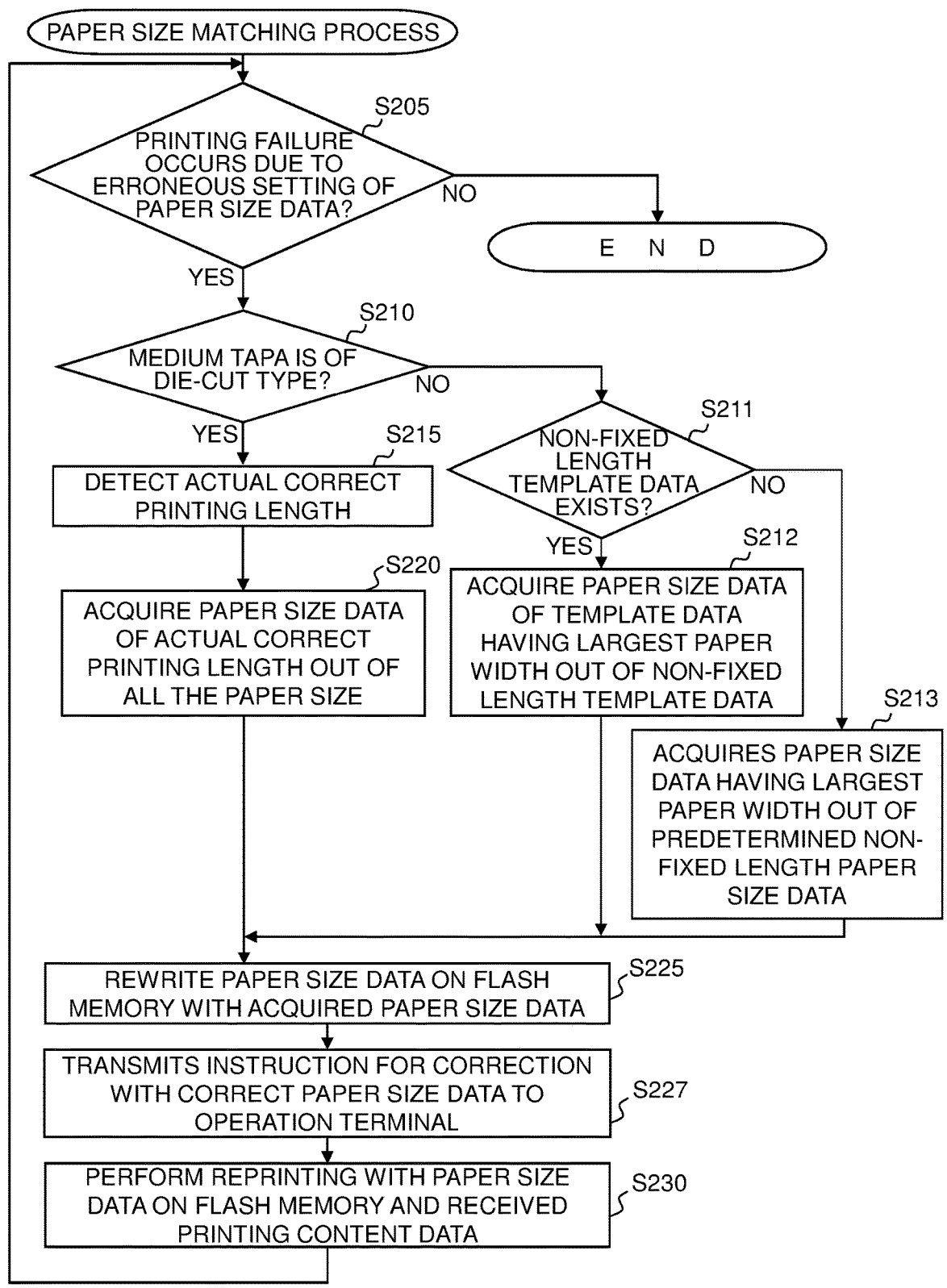

PRINT SETTING PROCESS FOR A MEDIUM AND PRINTED-MATTER PRODUCING APPARATUS

CROSS-REFERENCE TO RELATED APPLICATION

The present application claims priority from Japanese Patent Application No. 2017-229857, which was filed on Nov. 30, 2017, the disclosure of which is incorporated herein by reference in its entirety.

BACKGROUND

Field

The present disclosure relates to a medium storing a printed-matter producing program for setting a size of paper on which a print is formed by a printer, and a printed-matter producing apparatus.

Description of the Related Art

In a prior art, for example, a terminal etc. connected to a printer are used for performing a printing setting for a printer driver and a printing setting for firmware of the printer at the same time.

However, in the case that a user replaces and uses multiple types of print-receiving media having respective arbitrary paper sizes in the printed-matter producing apparatus having the configuration described above, for example, the user must perform the printing setting in both the printed-matter producing apparatus and a terminal etc. connected thereto each time the print-receiving medium is replaced, which is troublesome.

SUMMARY

An object of the present disclosure is to provide a medium and a printed-matter producing apparatus capable of performing favorable printing while eliminating the troublesome printing setting even in the case that a user replaces and uses multiple types of print-receiving media.

In order to achieve the above-described object, according to the aspect of the present application, there is provided a non-transitory computer-readable medium storing a printed-matter producing program for executing steps on a controller of a printed-matter producing apparatus that includes a feeder configured to feed a print-receiving medium, a printing head configured to form a print on the basis of print data onto the print-receiving medium fed by the feeder, a medium specification information storage memory configured to store medium specification information that is a set of various pieces of setting information related to specifications of the print-receiving medium defined as an object of printing, and the controller configured to control the feeder and the printing head, the steps comprising a reception step for receiving printing instruction information, an acquisition determination step for determining whether or not the medium specification information of the corresponding print-receiving medium is acquirable, on the basis of the printing instruction information received in the reception step, a medium specification information acquisition step for acquiring the medium specification information in the case that it is determined that the medium specification information is acquirable in the acquisition determination step, a consistency determination step for determining whether the medium specification information acquired in the medium specification information acquisition step is identical to the medium specification information stored in the medium specification information storage memory, a medium specification information replacement step for not replacing the stored medium specification information with the acquired medium specification information in the case that it is determined that the acquired medium specification information is identical to the stored medium specification information in the consistency determination step, and for replacing the stored medium specification information with the acquired medium specification information in the case that it is determined that the acquired medium specification information is not identical to the stored medium specification information in the consistency determination step, and a printed-matter production step for controlling the feeder and the printing head on the basis of one piece of the medium specification information stored in the medium specification information storage memory to produce a printed matter on which a print corresponding to the print data is formed.

BRIEF DESCRIPTION OF THE DRAWINGS

FIG. 1 is a functional block diagram showing detailed functions of parts of a printing system executing a printed-matter producing program of an embodiment of the present disclosure.

FIG. 2A is a plane view of a non-fixed length type showing an example of an appearance of a print-receiving tape.

FIG. 2B is a plane view of a die-cut type showing an example of an appearance of a print-receiving tape.

FIG. 3 is a software block diagram of an operation terminal and a label printer in the case of a normal printing form. Fig.

FIG. 4 is a diagram for explaining a data flow of an editor program and a printing control program in the case of a normal printing form.

FIG. 5 is a flowchart of a normal printing process executed by a control circuit of a label printer.

FIG. 6 is an example of an editing screen of the editor program.

FIG. 7 is a software block diagram of an operation terminal and a label printer in the case of a template printing form.

FIG. 8 is a diagram for explaining a data flow of the editor program and the printing control program in the case of the template printing form.

FIG. 9 is a flowchart of a template printing process executed by the control circuit of the label printer.

FIG. 10 is a flowchart of a paper size matching process executed by the control circuit of the label printer.

DETAILED DESCRIPTION OF THE PREFERRED EMBODIMENTS

Hereinafter, an embodiment of the present disclosure will be described with reference to the drawings.
<Schematic Configuration of System>

FIG. 1 is a functional block diagram showing detailed functions of parts of a printing system executing a printed-matter producing program of this embodiment. In FIG. 1, the printing system 1 has an operation terminal 2 including, for example, a general-purpose personal computer, and a label printer 3 connected to the operation terminal 2 through a communication network NW such as a LAN. The operation terminal 2 is connected to the label printer 3 through the communication network NW such that information can mutually be transmitted and received.

The label printer 3 (corresponding to an example of a printed-matter producing apparatus) transmits and receives various kinds of information and instruction signals to and from the operation terminal 2 and produces a print label (corresponding to an example of printed matter) including a print of desired characters, figures, etc. on the basis of user's operation on the operation terminal 2. This label printer 3 can produce a print label of an arbitrary length (not shown) by using a print-receiving tape (described later) of a desired width wound around a tape roll (described later) attached to the label printer 3. In the label printer 3, multiple types of tape rolls or cartridges corresponding to types of print-receiving tapes can be attached and detached for replacement, and therefore, a user can arbitrarily select a print-receiving tape of a desired type of width size (paper size).

The operation terminal 2 includes a CPU 12, a memory 13 composed of, for example, a RAM and a ROM, an operation part 14 to which instructions and information from a user are input, a display part 17 displaying various kinds of information and messages, a communication control part 15 controlling transmitting and receiving of information signals to/from the label printer 3 etc., and a mass storage device 16 storing various kinds of programs and information. The user operates the operation terminal 2 to edit a print of desired characters and figures and transmits the print data to the label printer 3.

The CPU 12 executes various processes and transmits and receives various instruction signals and information signals to and from the label printer 3 etc. in accordance with programs (including a printed-matter producing program described later) stored in advance in the ROM serving as a recording medium or the mass storage device 16 serving as the recording medium while utilizing a temporary storage function of the RAM.

As shown in FIG. 2, the label printer 3 etc. include: a tape roll holder part 210 capable of attaching and detaching a tape roll 204 formed by winding a print-receiving tape (simplified in the figure and shown as concentric circles although actually having a spiral shape) 230 serving as a print-receiving medium (or capable of attaching and detaching a cartridge including the tape roll 204); a tape sensor 211 mechanically or electromagnetically detecting and transmitting to a control circuit 202 attached tape information (described later) on the tape roll 204 (or cartridge) attached to the tape roll holder part 210; a marking sensor 212 composed of a projector 212a for projecting light to a marking (described later) printed on the print-receiving tape 203 and a receiver 212b receiving reflected light thereof; a printing head 205 forming a desired print on the print-receiving tape 203 fed out from the tape roll 204; a cutter 207 cutting the tape 203 after print to a desired length to form a print label; a feeder 209 disposed oppositely to the printing head 205 and controlled by the control circuit 202 to feed the tape 203 from the tape roll 204; an operation part 213 for inputting instructions and information from the user; and a display part 214 displaying various kinds of information and messages. The control circuit 202 (corresponding to an example of a controller) is connected to the communication control part 15 of the operation terminal 2 via the communication control part 208 and the communication network NW. As a result, the label printer 3 etc. can transmit and receive information to and from the operation terminal 2. The control circuit 202 includes a memory 215, and printing content data, paper size data, and template data described later are stored in the memory 215 (described later).

<Tape Type and Paper Size of Print-Receiving Tape>

As described above, the label printer 3 of this embodiment uses the tape roll 204 formed by winding the print-receiving tape 203 attached thereto, forms a desired print on the print-receiving tape 203 fed out from the tape roll 204, and cuts the tape to a desired length to produce a print label. The print-receiving tape 203 attached to the label printer 3 as described above is mainly classified into two tape types, which are a non-fixed length type 203A as shown in FIG. 2A and a die-cut type as shown in FIG. 2B.

A tape of the non-fixed length type 203A is a continuous belt body having a constant paper width W with no particular division in a transport direction so that print on a paper surface and cutting can be performed to an arbitrary length in the transport direction. A tape of the die cut type 203B has multiple label stamps 222 each formed into the same length, affixed in a peelable manner on a mount 221 (separation sheet) having a constant paper width W, and arranged at equal intervals in the transport direction, so that printing and cutting are performed in accordance with a printing length L of each of the label stamp 222. The tape of the die-cut type 203B also has markings 223 printed in advance, for example, in a black-painted rectangular shape at the same arrangement intervals as the label stamps 222 on a back surface of the mount 221 on the side opposite to the label stamps 222. The marking sensor 212 optically detects the presence and the arrangement intervals of the markings 223, so that the control circuit 202 of the label printer 3 can detect that the attached print-receiving tape 203 is of the die-cut type 203B, and the arrangement intervals of the label stamps 222 (the length of each stamp in the transport direction).

To the label printer 3 of this embodiment, the print-receiving tapes 203 of various paper widths can be attached regardless of the tape type, and a print can be formed in an appropriate print size in accordance with the paper width of the attached print-receiving tape 203. In the usual case, on the premise that the attached tape roll 204 has a specific paper width W (i.e., a predetermined size) prepared in advance by the manufacturer side of the label printer 3, the tape sensor 211 mechanically or electromagnetically detects the attached tape information including the paper width W.

However, on the other hand, a demand exists for attaching a tape roll 204 of an arbitrary paper width W prepared by the user for producing a print label. In this case, it is necessary to attach a sensor cover 211a (see FIG. 1) to disable the function of the tape sensor 211, and the user must input and set the attached tape information such as the tape type and the paper size of the print-receiving tape 203 desired to be used separately.

The tape type and the paper size are important parameters related to both editing of print contents in the operation terminal 2 and control of print and cutting in the label printer 3 and therefore must be input and set in both the operation terminal 2 and the label printer 3. However, in the case that the user frequently replaces the multiple tape rolls 204 of arbitrary different paper sizes, the paper size must be input and set in both the operation terminal 2 and the label printer 3 each time, resulting in complicated operations. In this regard, in the printing system 1 of this embodiment, by inputting and setting the paper size only once for the operation terminal 2, the paper size is automatically input and set also in the label printer 3. A structure and a technique for this arrangement will hereinafter be described in detail in order.

<Case of Normal Printing Form>

A type of a printing form in the printing system 1 will be described. First, as described above, a user uses the operation terminal 2 to edit the print contents having a size corresponding to the paper size, and in the usual case, the user produces image data of a dot pattern (so-called raster data) generated by combining only arbitrary characters, figures, and images. In an example of this embodiment, the form of printing such image data as printing content data is defined as normal printing, and the case of this normal printing form will hereinafter be described.

FIG. 3 shows software blocks schematically showing respective control contents executed by the CPU 12 of the operation terminal 2 and the control circuit 202 of the label printer 3 in the case of this normal printing form. In FIG. 3, the operation terminal 2 has a printer application set 301 installed in the mass storage device 16 in an executable manner as a set of application programs related to the operation of the label printer 3. The printer application set 301 mainly has an editor program 302 editing print data and a driver 303 controlling the label printer 3.

In this normal printing form, the editor program 302 accepts and stores an input setting of paper size data 501 of the tape roll 204 actually attached by the user and edits a combination of arbitrary characters, figures, and images in a size corresponding to the paper size to generated and store the image data of the dot pattern as printing content data 502 (corresponding to an example of print data).

The driver 303 accepts printing settings of the type of print-receiving tape 203 such as the non-fixed length type 203A and the die-cut type 203B, the number of print labels to be printed with the printing content data 502, etc., and transmits the printing instruction information including these printing settings, the printing content data 502, and the paper size data 501 to the label printer 3.

On the other hand, the label printer 3 has a printer control program 401 related to the control of the label printer 3 stored in the memory 215 in an executable manner. The printer control program 401 mainly has a printing control program 402 controlling a print operation of the printing head 205, and a feeding control program 403 controlling a feeding operation of the feeder 209.

The printing control program 402 controls energization of the printing head 205 on the basis of the printing content data 502 and the paper size data 501 received from the operation terminal 2. Particularly, for the paper size data 501, an appropriate replacement process is executed depending on the situation (see FIG. 4 described later).

The feeding control program 403 performs drive control for the feeder 209 by reference to the paper size data 501. The feeding control program 403 also performs drive control of the cutter 207 in synchronization with the feeder 209.

A set (described later) of various pieces of setting data (setting information) related to the specification of the print-receiving tape 203 such as the type and the paper size of the print-receiving tape 203 corresponds to an example of medium specification information described in claims.

<Data Flow in Normal Printing Form>

A data flow in the editor program 302 and the printing control program 402 shown in FIG. 3 is shown in FIG. 4. In FIG. 4, the driver 303 and the printing settings are not shown for avoiding complications.

First, in the operation terminal 2, the paper size data 501 ("aaa mm×bbb mm" in FIG. 4) is manually input and set by the user on the editor program 302. In the case of the non-fixed length type 203A shown in FIG. 2A, the paper size data 501 is input as the paper width W ("aaa mm") and a printing length L arbitrarily set by the user (i.e., print label length: "Bbb mm"). It is noted that setting data related to the type of the print-receiving tape 203 is not shown (the same applies hereinafter). Additionally, although various kinds of setting data other than the paper size data 501 and the type of the print-receiving tape 203 are utilized as the setting data related to the specification of the print-receiving tape 203, only the paper size data 501 and the type of print-receiving tape 203 will be described in this example, and only the paper size data 501 is shown (the same applies hereinafter).

The user edits and inputs the arbitrary printing content data 502 within a print range defined by the paper size data 501 described above (see an edit screen of FIG. 6 described later). In the normal printing form, the editor program 302 converts the printing content data 502 into image data of a dot pattern.

In this embodiment, the driver 303 transmits the paper size data 501 and the printing content data 502 together to the label printer 3 as the printing instruction information (printing settings are not shown). Regarding the medium specification information that is a portion of the printing instruction information, various kinds of setting data related to the specification of the print-receiving tape 203 are stored as the medium specification information in addition to the type and the paper size of the print-receiving tape 203; however, because of the enormous number and contents of the data viewed as a whole, only the paper size data 501 is shown in the figure, and the other pieces of the medium specification information are not shown.

The label printer 3 receiving the printing instruction information records the paper size data 501 in a dedicated recording area on the memory 215 by the printing control program 402. In the example of this embodiment, 64 recording areas are prepared in this dedicated recording area. First to 63rd areas among them are set in an area 215A of the ROM recording the paper size data 501 of predetermined lengths prepared by the manufacturer in a non-rewritable manner, and only the last 64th area is set in an area 215B of a flash memory (so-called nonvolatile storage device: corresponding to an example of a medium specification information storage memory in this embodiment) recording the paper size data 501 arbitrary set by the user in a rewritable manner. Since even one piece of the medium specification information has a large volume of data as described above, the flash memory area 215B requiring a relatively high manufacturing cost is provided with a storage capacity capable of storing only one piece of the medium specification information in the example of this embodiment.

Therefore, when the printing control program 402 receives the printing instruction information, it determines whether or not the paper size data 501 is included and acquirable in the printing instruction information. In the case that the data is acquirable, it is further determined whether or not the acquired paper size data 501 is identical to the paper size data 501 already recorded in the flash memory area 215B. In the case that the data is identical, the data is left unchanged, and in the case that the data is not identical, the newly acquired paper size data 501 is considered as the paper size data 501 corresponding to the tape roll 204 actually attached at the current point in time and is used for rewriting the flash memory area 215B.

By executing the process as described above, the printing control program 402 and the feeding control program 403 can both refer only to the paper size data 501 recorded in the flash memory area 215B to perform the printing control and the feeding control.

The printing content data 502 included in the printing instruction information is separately recorded in a storage area 215C of the RAM, and the printing control program 402 performs the printing control based on the printing content data 502 in the RAM area 215C together with the paper size data 501 in the flash memory area 215B.

As described above, the printing system 1 of this embodiment transmits the paper size data 501 from the operation terminal 2 together with the printing content data 502 to the label printer 3, and therefore, the user can reflect the paper size input and set for the operation terminal 2 also in the label printer 3. Therefore, even in the case that the user attaches the replacing tape roll 204 of an arbitrary paper size not included in the predetermined sizes, the input setting of the paper size needs to be performed only once for the operation terminal 2 and is not required for the label printer 3, so that the operability is improved.

<Control Procedure in the Case of the Normal Printing Form>

FIG. 5 shows an example of a control procedure executed by the control circuit 202 of the label printer 3 to implement the normal printing process. The execution of the flow shown in FIG. 5 is started when the label printer 3 is powered on.

At step S5, the control circuit 202 receives the printing instruction information from the operation terminal 2.

The procedure goes to step S10, and the control circuit 202 determines whether or not the paper size data 501 is included in the printing instruction information received at step S5. In the case that the paper size data 501 is not included in the printing instruction information, the determination is negative (S10: NO), and the procedure goes to step S25.

On the other hand, in the case that the paper size data 501 is included in the printing instruction information, the determination is affirmative (S10: YES), and the procedure goes to step S15.

At step S15, the control circuit 202 determines whether or not the paper size data 501 (abbreviated as "received size data" in FIG. 5) included in the received printing instruction information is identical to the paper size data 501 already recorded in the flash memory area 215B (abbreviated as "registered size data" in FIG. 5). In the case that the data is identical, the determination is affirmative (S15: YES), and the procedure goes to step S25.

On the other hand, in the case that the data is not identical, the determination is negative (S15: NO), and the procedure goes to step S20.

At step S20, the control circuit 202 rewrites and overwrites the paper size data 501 already recorded in the flash memory area 215B with the paper size data 501 acquired from the received printing instruction information.

The procedure goes to step S25, and the control circuit 202 performs the printing control based on the paper size data 501 on the flash memory area 215B and the printing content data 502 included in the received printing instruction information to produce a print label. This flow is then terminated.

In the above description, the control procedure of step S5 corresponds to an example of a reception step described in claims, and the process executed by the control circuit 202 at step S5 corresponds to an example of a reception process. The control procedure of step S10 corresponds to an example of an acquisition determination step described in claims, and the process executed by the control circuit 202 at step S10 corresponds to an example of an acquisition determination process. The control procedure of step S15 corresponds to an example of a medium specification information acquisition step and a consistency determination step described in claims, and the process executed by the control circuit 202 at step S15 corresponds to an example of a medium specification information acquisition process and a consistency determination process. The control procedure of step S20 corresponds to an example of a medium specification information replacement step described in claims, and the process executed by the control circuit 202 at step S20 corresponds to an example of a medium specification information replacement process. The control procedure of step S25 corresponds to an example of a printed-matter production step described in claims, and the process executed by the control circuit 202 at step S25 corresponds to an example of printed-matter production process. The printing control program 402 executing the flowchart of the normal printing process shown in FIG. 5 corresponds to an example of the printed-matter producing program.

Effects of this Embodiment

As described above, in the case that the normal printing is performed in the printing control program 402 of this embodiment, the paper size data 501 of the corresponding print-receiving tape 203 is added to the printing content data. Specifically, when the printing control program 402 of this embodiment is executed by the control circuit 202, the printing instruction information is first received from, for example, the operation terminal 2, in the procedure of step S5. When the normal printing is performed, the printing content data 502 itself is the printing instruction information.

Subsequently, in the procedure of step S10, it is determined whether or not the paper size data 501 of the corresponding print-receiving tape 203 can be acquired on the basis of the received printing instruction information. When the normal printing is performed, it is determined whether or not the paper size data 501 is added to the received printing content data 502. In the case that the paper size data 501 is added to the printing content data 502, the determination is affirmative, so that the added paper size data 501 is acquired in the subsequent procedure of step S15.

In the subsequent procedure of step S15, it is determined whether or not the paper size data 501 acquired in this way is identical to the paper size data 501 stored in the flash memory area 215B at the current point in time. In the case that the data is determined as not being identical, the stored paper size data 501 is replaced by the added paper size data 501 in the subsequent procedure of step S20. In the subsequent procedure of step S25, the feeder 209 and the printing head 205 are controlled on the basis of the replacing paper size data 501, and a print label is produced.

As described above, since the paper size data 501 is added to the printing content data 502, even in the case that the contents of the paper size data 501 of the label printer 3 are different from the contents of the added paper size data 501, the contents are automatically unified into the same contents through the replacement.

In this embodiment, one piece of the paper size data 501 is stored in a rewritable manner in the flash memory area 215B, and it is determined in the procedure of step S15 whether or not the paper size data 501 acquired from the printing instruction information and added to the printing content data 502 is identical to the one piece of the paper size data 501 stored in the flash memory area 215B.

In the operation terminal 2, the paper size data 501 input and set in the past may be cumulatively stored and reflected in the editor program 302. For example, as shown in FIG. 6 showing an example of an editing screen 601 of the editor program 302 displayed on the display part, the input setting of the paper size can selectively be set from a so-called pull-down menu 602. In a list of the pull-down menu 602, arbitrary paper sizes (described as "custom size" in FIG. 6) stored as a result of input setting separately performed by the user in the past may be displayed as a list in a selectable manner.

The present disclosure is not limited to the embodiment and can variously be modified without departing from the spirit and the technical ideas thereof. Such modification examples will hereinafter be described in order. The portions equivalent to those of the embodiment are denoted by the same reference numerals and will not be described or will be described in a simplified manner as needed.

(1) In the Case of Template Printing Form

In the embodiment, the printing content data 502 of the dot pattern is included in the printing instruction information and transmitted to the label printer 3; however, the present disclosure is not limited thereto. On the other hand, in a form referred to as a template printing form, printing is performed by using template data (so-called vector data) produced by a user arbitrarily selecting data from multiplicities of image data and frame line data (corresponding to print objects) prepared in advance by the manufacturer and designating a size and arrangement thereof. In this modification example, description will be made of the case of the template printing form in which printing is performed by using such template data.

FIG. 7 shows software blocks of the operation terminal 2 and the label printer 3 corresponding to FIG. 3 in the case of the template printing form. In FIG. 7, although the printer application set 301 and the editor program 302 included in the operation terminal 2 are the same, the blocks are different from the embodiment in that a template producing program 304 is included instead of the driver 303 in the embodiment and that the paper size data 501 and the printing content data 502 handled by the editor program 302 are incorporated in template data 503 by the template producing program 304.

In this template printing form, the editor program 302 accepts the input setting of the paper size data 501 and the printing content data 502 (corresponding to an example of print data) as in the embodiment. The data contents of the printing content data 502 handled in the template printing form are identification data of the print object itself to be printed and data indicative of the arrangement and size thereof and are different from the data contents of the printing content data 502 of image data handled in the normal printing form of the embodiment. The template data 503 is an aggregate of the identification data of a print object designated by a user through the editor program 302 out of a multiplicity of print objects separately transmitted and stored into the label printer 3 in advance and the data designating the size and arrangement thereof, and in this modification example, the template producing program 304 produces the template data 503 incorporating the paper size data 501 and the printing content data 502.

Correspondingly, while the label printer 3 includes the printer control program 401, the printing control program 402, and the feeding control program 403, the printing control program 402 extracts the paper size data 501 from the template data 503 and produces and individually handles the printing content data 502.

A data flow in the editor program 302, the template producing program 304, and the printing control program 402 in this modification example shown in FIG. 7 is shown in FIG. 8 corresponding to FIG. 4.

First, in the operation terminal 2, as in the embodiment, the user performs the input setting of the paper size data 501 on the editor program 302 and edits and inputs the arbitrary printing content data 502. Furthermore, in this modification example, the user additionally performs input setting to designate which print object is printed in what size and what arrangement. The editor program 302 delivers the paper size data 501, the printing content data 502, and a designation input setting of the print object to the template producing program 304.

In this modification example, the template producing program 304 produces the template data 503 in which the paper size data 501, the printing content data 502, and the designation input setting (not shown) of the print object are incorporated together and produces this data as printing instruction information (printing settings are not shown) to the label printer 3.

The label printer 3 receiving the printing instruction information records the template data 503 included in the printing instruction information in a dedicated recording area (corresponding to a template storage memory) on the memory 215 by the printing control program 402. In the case that the paper size data 501 is determined as being incorporated in the template data 503 just recorded at the time of printing, the paper size data 501 is acquired and recorded in the dedicated recording area 215B (the same as that of the embodiment) for the paper size data 501 on the flash memory. It is determined also in this modification example whether or not the newly acquired paper size data 501 is identical to the already recorded paper size data 501, and in the case that the data is identical, the data is left unchanged, and in the case that the data is not identical, the data is overwritten and rewritten.

By executing the process as described above, as in the embodiment, the printing control program 402 and the feeding control program 403 can both refer only to the paper size data 501 recorded in the flash memory area 215B to perform the printing control and the feeding control.

The printing control program 402 performs the printing control on the basis of the template data 503 and the paper size data 501 in the flash memory area 215B.

As described above, in the printing system 1 of this modification example, the template data 503 incorporating the paper size data 501 is transmitted from the operation terminal 2 to the label printer 3.

<Control Procedure in the Case of the Template Printing Form>

FIG. 9 shows an example of a control procedure executed by the control circuit 202 of the label printer 3 to implement the template printing process. The execution of the flow shown in FIG. 5 is started when the label printer 3 is powered on.

First, at step S105, the control circuit 202 receives the printing instruction information from the operation terminal 2.

The procedure goes to step S110, and the control circuit 202 produces the printing content data 502 from the corresponding template data 503 on the basis of the template number included in the printing instruction information received at step S105.

The procedure goes to step S115, and the control circuit 202 determines whether or not the paper size data 501 is included in the template data 503 recorded at step S110. In the case that the paper size data 501 is not included in the template data 503, the determination is negative (S115: NO), and the procedure goes to step S130.

On the other hand, in the case that the paper size data 501 is included in the template data 503, the determination is affirmative (S115: YES), and the procedure goes to step S120.

At step S120, the control circuit 202 determines whether or not the paper size data 501 included in the template data 503 (abbreviated as "extraction size data" in FIG. 9) is identical to the paper size data 501 already recorded in the flash memory area 215B (abbreviated as "registered size data" in FIG. 9). In the case that the data is identical, the determination is affirmative (S120: YES), and the procedure goes to step S130.

On the other hand, in the case that the data is not identical, the determination is negative (S120: NO), and the procedure goes to step S125.

At step S125, the control circuit 202 rewrites and overwrites the paper size data 501 already recorded in the flash memory area 215B with the paper size data 501 extracted from the template data 503.

The procedure goes to step S130, and the control circuit 202 performs the printing control on the basis of the paper size data 501 on the flash memory area 215B and the printing content data 502 produced from the template data 503 to produce a print label. This flow is then terminated.

In the above description, the control procedure of step S105 corresponds to an example of the reception step described in claims, and the process executed by the control circuit 202 at step S105 corresponds to an example of the reception process. The control procedure of step S115 corresponds to an example of the acquisition determination step described in claims, and the process executed by the control circuit 202 at step S115 corresponds to an example of the acquisition determination process. The control procedure of step S120 corresponds to an example of the medium specification information acquisition step and the consistency determination step described in claims, and the process executed by the control circuit 202 at step S120 corresponds to an example of the medium specification information acquisition process and the consistency determination process. The control procedure of step S125 corresponds to an example of the medium specification information replacement step described in claims, and the process executed by the control circuit 202 at step S125 corresponds to an example of the medium specification information replacement process. The control procedure of step S130 corresponds to an example of the printed-matter production step described in claims, and the process executed by the control circuit 202 at step S130 corresponds to an example of the printed-matter production process. The printing control program 402 executing the flowchart of the template printing process shown in FIG. 9 corresponds to an example of the printed-matter producing program.

As described above, the printing control program 402 of this modification example has a plurality of pieces of the template data 503 stored in the storage area of the memory dedicated to the template data 503 and one piece of the paper size data 501 stored in a rewritable manner in the flash memory area 215B (corresponding to the medium specification information storage memory in this modification example), and it is determined at step S120 whether or not the medium specification information 503 included at the template number specified in the printing instruction information is identical to the one piece of the paper size data 501 stored in the flash memory area 215B, so as to overwrite and rewrite the data only in the case that the data is not identical.

(2) The Case of Using Paper Size Data of Template Data in the Normal Printing Form The label printer 3 performing printing in the template printing form of the first modification example has the common configuration recording the paper size data 501 in the flash memory area 215B and therefore can perform printing in the normal printing form. Therefore, the one label printer 3 can be used in both the normal printing form and the template printing form. As a result, if it is known in the normal printing form that the template data 503 incorporating the paper size data 501 to be applied is already recorded in the dedicated storage area of the memory of the label printer 3, the driver 303 may designate the corresponding template data 503 without adding the paper size data 501 to the printing instruction information and may give an instruction for acquiring the paper size data 501 therefrom.

(3) The Case of Matching a Paper Size of Incorrect Setting Input

Since the user often manually sets and inputs the paper size data 501 to the operation terminal 2, the incorrect paper size data 501 may be set and input. In this case, a printing failure occurs on a print label produced by the label printer 3; however, the label printer 3 can automatically correctly match the erroneous setting input of the paper size data 501 causing the printing failure. A technique of matching the paper size data 501 will hereinafter be described.

As described above, the paper size data 501 is data composed of a combination of two parameters of the paper width W and the printing length L. The configuration of the label printer 3 of the present disclosure has no function of detecting the paper width W of the currently attached print-receiving tape 203; however, only in the case that the type of the print-receiving tape 203 is the die-cut type 203B, the correct printing length L (corresponding to an example of actual medium specification information) can be detected by detecting the markings 223.

Therefore, in the case that a printing failure occurs in the printing using the print-receiving tape 203 of the die-cutting type 203B (in both the normal printing form and the template printing form), the correct printing length L of the currently attached print-receiving tape 203 is detected from the arrangement interval of the markings 223 detected in the printing process.

Among all the paper size data recorded in the entire memory 215 regardless of whether the predetermined size or the custom size (the paper size arbitrarily set by the user), if any paper size data has the printing length L equal to the detection value, the paper width W thereof is likely to be the same as the correct paper width W of the actually attached print-receiving tape 203. In other words, assuming that the print-receiving tape 203 used in the past is repeatedly attached again this time, if the printing length L is the same, the paper width W is highly likely to be the same. Therefore, the printing failure can be improved in some cases by acquiring the paper size data having the same printing length L as the correct printing length L from the memory 215 (the entire area including both the ROM area 215A and the flash memory area 215B: corresponding to the medium specification information storage memory in this modification example) and by performing reprinting based on the paper size data.

<Control Procedure of Paper Size Matching Process>

FIG. 10 shows an example of a control procedure executed by the control circuit 202 of the label printer 3 to implement the paper size matching process. Regardless of whether the normal printing form or the template printing form, the execution of the flow shown in FIG. 10 is started after termination of the printing process.

First, at step S205, the control circuit 202 uses some kind of a detection device to determine whether or not a printing failure has occurred due to an erroneous setting input of the paper size data 501. The detection device may be a device based on an operation input from a user or may be a device based on a change in response of a control signal in the printing head 205 or the feeder 209 in other cases. In the case that no printing failure has occurred due to an erroneous setting input of the paper size data 501, the determination is negative (S205: NO), and this flow is terminated.

On the other hand, if a print failure has occurred due to an erroneous setting input of the paper size data 501, the determination is affirmative (S205: YES), and the procedure goes to step S210.

At step S210, the control circuit 202 determines whether or not the type of the print-receiving tape 203 subjected to printing is the die-cut type 203B, or specifically, whether or not the marking 223 is detected by the marking sensor 212. In the case that the type of the print-receiving tape 203 is not the die-cut type 203B, the determination is negative (S210: NO), and the procedure goes to step S211.

On the other hand, in the case that the type of the print-receiving tape 203 is the die-cut type 203B, the determination is affirmative (S210: YES), and the procedure goes to step S215.

At step S215, the control circuit 202 calculates (detects) the actual correct printing length L on the basis of the time interval of detection of the marking 223 by the marking sensor 22 and the tape feeding speed.

The procedure then goes to step S220, and the control circuit 202 acquires the paper size data 501 identical to the actual correct printing length L detected at step S215 out of all the paper size data 501 recorded in the memory 215 (the ROM area 215A and the flash memory area 215B). If multiple identical printing lengths L are recorded, for example, the data is acquired in order from newest to oldest. If no identical length exists, closer data is acquired. In other words, the paper size data 501 having a high matching degree is acquired. In the case of the template printing form, the data may be acquired from the paper size data 501 embedded in all the template data stored in the memory 215 (see FIG. 8). The procedure then goes to step S225.

On the other hand, at step S211, the control circuit 202 determines whether or not non-fixed length template data exists in the label printer 3. In other words, it is determined whether or not the label printer 3 has a function of printing in the template printing form and the template data for that purpose stored therein. In the case that the template data exists, the determination is affirmative (S211: YES), and the procedure goes to step S212.

At step S212, the control circuit 202 acquires the paper size data 501 of the template data having the largest paper width W out of the non-fixed length template data, and the procedure goes to step S225.

On the other hand, in the case that no non-fixed length template data exists in the determination of step S211, the determination is negative (S211: NO), and the procedure goes to step S213.

At step S213, the control circuit 202 acquires the paper size data 501 having the largest paper width W out of all the non-fixed length paper size data 501 recorded in the memory 215 (the ROM area 215A and the flash memory area 215B), and the procedure goes to step S225.

At step S225, the control circuit 202 rewrites and overwrites the paper size data 501 recorded in the previous printing in the flash memory area 215B with the paper size data 501 acquired at step S220.

The procedure then goes to step S227, and the control circuit 202 transmits to the operation terminal 2 a command requesting a correction of the medium specification information on the premise that the paper size data 501 acquired at step S220 is the correct paper size data 501. The operating terminal 2 receives this command and correctly corrects the paper size data 501 by the editor program 302 (not particularly shown).

The procedure then goes to step S230, and the control circuit 202 performs reprinting based on the paper size data 501 on the flash memory area 215B and the printing content data 502 included in the received printing instruction information to produce a print label. The control circuit 202 then returns to step S205 to repeat the same procedure.

In the above description, the control procedure of step S215 corresponds to an example of an actual medium specification information acquisition step described in claims; the control procedure of step S220 corresponds to an example of a matching determination step described in claims; and the control procedure of step S225 corresponds to an example of a medium specification information replacement step described in claims.

It is noted that terms "vertical", "parallel", "plane", etc. in the above description are not used in the exact meanings thereof. Specifically, these terms "vertical", "parallel", "plane", etc. allow tolerances and errors in design and manufacturing and have meanings of "substantially vertical", "substantially parallel", and "substantially plane", etc.

It is noted that terms "same", "equal", "different", etc. in relation to a dimension and a size of the appearance in the above description are not used in the exact meaning thereof. Specifically, these terms "same", "equal", and "different" allow tolerances and errors in design and manufacturing and have meanings of "substantially the same", "substantially equal", and "substantially different".

However, when a value used as a predefined determination criterion or a delimiting value is described such as a threshold value and a reference value, the terms "same", "equal", "different", etc. used for such a description are different from the above definition and have the exact meanings.

The arrows shown in the figures such as FIGS. 4 and 8 indicate an example of a signal flow and are not intended to limit the signal flow directions.

The flowcharts shown in FIGS. 5, 9, 10, etc. are not intended to limit the present disclosure to the flows, and the procedures may be added/deleted or may be executed in different order without departing from the spirit and the technical ideas of the disclosure.

The techniques of the embodiment and modification examples may appropriately be utilized in combination other than those described above.

Although not exemplarily illustrated one by one, the present disclosure is implemented with other various modifications applied without departing from the spirit thereof.

What is claimed is:

1. A non-transitory computer-readable medium storing a printed-matter producing program for executing steps on a controller of a printed-matter producing apparatus that includes a feeder configured to feed a print-receiving medium, a printing head configured to form a print based on print data onto said print-receiving medium fed by said feeder, a medium specification information storage memory configured to store plural pieces of medium specification information, one piece of medium specification information being a set of various pieces of setting information related to specifications of said print-receiving medium defined as an object of printing, and said controller configured to control said feeder and said printing head, said steps comprising:

a reception step for receiving printing instruction information;

an acquisition determination step for determining whether or not said one piece of medium specification information of the corresponding print-receiving medium is acquirable, based on the printing instruction information received in said reception step;

a medium specification information acquisition step for acquiring said one piece of medium specification information in the case that it is determined that said one piece of medium specification information is acquirable in said acquisition determination step;

a consistency determination step for determining whether said one piece of medium specification information acquired in said medium specification information acquisition step is identical to said one piece of medium specification information stored in said medium specification information storage memory;

a medium specification information replacement step for not replacing the stored one piece of medium specification information with the acquired one piece of medium specification information in the case that it is determined that the acquired one piece of medium specification information is identical to the stored one piece of medium specification information in said consistency determination step, and for replacing the stored one piece of medium specification information with the acquired one piece of medium specification information in the case that it is determined that the acquired one piece of medium specification information is not identical to the stored one piece of medium specification information in said consistency determination step;

a printed-matter production step for controlling said feeder and said printing head based on the one piece of medium specification information stored in said medium specification information storage memory to produce a printed matter on which a print corresponding to said print data is formed;

an actual medium specification information acquisition step for acquiring actual medium specification information of said print-receiving medium fed by said feeder at a time of production of said printed matter in said printed matter production step, the actual medium specification information being acquired after and separately from acquiring the one piece of medium specification information in the medium specification information acquisition step;

a matching determination step for determining a matching degree between the one piece of medium specification information stored in said medium specification information storage memory and used at the time of production of said printed matter in said printed-matter production step, and said actual medium specification information acquired in said actual medium specification information acquisition step; and a medium specification information replacement step for replacing the one piece of said medium specification information used for producing said printed matter with one piece of medium specification information satisfying a predetermined condition among the plural pieces of medium specification information stored in said medium specification information storage memory in accordance with the matching degree determined in said matching determination step.

2. The medium according to claim 1, wherein in said reception step, said print data is received as said printing instruction information, wherein in said acquisition determination step, it is determined whether or not said one piece of medium specification information is added to said print data received in said reception step, wherein in said medium specification information acquisition step, said one piece of medium specification information added to said print data is acquired, wherein in said consistency determination step, it is determined whether or not said one piece of medium specification information added to said print data acquired in said medium specification information acquisition step is identical to one piece of said medium specification information stored in said medium specification information storage memory, wherein in the case that it is determined that the added one piece of medium specification information is not identical to the stored one piece of said medium specification information in said consistency determination step, the stored one piece of said medium specification information is replaced with the added one piece of medium specification information in said medium specification information replacement step, and wherein said feeder and said printing head are controlled based on the replaced one piece of said medium specification information to produce said printed matter in said printed-matter production step.

3. The medium according to claim 1, wherein said printed-matter producing apparatus further comprises a template storage memory configured to store a plurality of templates each including print objects allocated in a predetermined form, wherein in said reception step, said printing instruction information that includes designation of a desired template among the plurality of templates stored in said template storage memory is received, wherein in said acquisition determination step, it is determined whether or not said one piece of medium specification information is embedded in said template specified by the designation, wherein in said medium specification information acquisition step, said one piece of medium specification information embedded in the specified template is acquired, wherein in said consistency determination step, it is determined whether or not said medium specification information embedded in said template acquired in said medium specification information acquisition step is identical to one piece of said medium specification information stored in said medium specification information storage memory, wherein in the case that it is determined that the embedded one piece of medium specification information is not identical to the stored one piece of said medium specification information in said consistency determination step, the stored one piece of said medium specification information is replaced with the one piece of embedded medium specification information in said medium specification information replacement step, and wherein said feeder and said printing head are controlled based on the replaced one piece of said medium specification information to produce said printed matter in said printed-matter production step.

4. The medium according to claim 1, wherein
said printed-matter producing apparatus further comprises
a template storage memory configured to store a plurality of templates each including print objects allocated in a predetermined form, wherein
in said reception step, said print data is received as said printing instruction information, wherein
in said acquisition determination step, it is determined whether or not said one piece of medium specification information is embedded in said templates stored in said template storage memory, wherein
in said medium specification information acquisition step, said one piece of medium specification information embedded in said templates is acquired, wherein
in said consistency determination step, it is determined whether or not said one piece of medium specification information embedded in said templates acquired in said medium specification information acquisition step is identical to one piece of said medium specification information stored in said medium specification information storage memory, wherein
in the case that it is determined that the embedded one piece of medium specification information is not identical to the stored one piece of said medium specification information in said consistency determination step, the stored one piece of said medium specification information is replaced with the embedded one piece of medium specification information in said medium specification information replacement step, and wherein said feeder and said printing head are controlled based on the replaced one piece of said medium specification information to produce said printed matter in said printed-matter production step.

5. The medium according to claim 1, wherein the steps further include detecting a printing failure occurring due to at least one setting of the set of various pieces of setting information of the one piece of medium specification information being incorrect, and
wherein the actual medium specification information acquisition step is performed after detecting the printing failure.

6. A printed-matter producing apparatus comprising:
a feeder configured to feed a print-receiving medium;
a printing head configured to form a print based on print data onto said print-receiving medium fed by said feeder;
a medium specification information storage memory configured to store plural pieces of medium specification information, one piece of medium specification information being a set of various pieces of setting information related to specifications of said print-receiving medium defined as an object of printing; and
a controller configured to control said feeder and said printing head;
said controller being configured to execute:
a reception process for receiving printing instruction information,
an acquisition determination process for determining whether or not said one piece of medium specification information of the corresponding print-receiving medium is acquirable, based on the printing instruction information received in said reception process,
a medium specification information acquisition process for acquiring said one piece of medium specification information in the case that it is determined that said one piece of medium specification information is acquirable in said acquisition determination process,
a consistency determination process for determining whether said one piece of medium specification information acquired in said medium specification information acquisition process is identical to said one piece of medium specification information stored in said medium specification information storage memory,
a medium specification information replacement process for not replacing the stored one piece of medium specification information with the acquired one piece of medium specification information in the case that it is determined the acquired one piece of medium specification information is identical to the stored one piece of medium specification information in said consistency determination process, and for replacing the stored one piece of medium specification information with the acquired one piece of medium specification information in the case that it is determined that the acquired one piece of medium specification information is not identical to the stored one piece of medium specification information in said consistency determination process, and
a printed-matter production process for controlling said feeder and said printing head based on the one piece of medium specification information stored in said medium specification information storage memory to produce a printed matter on which a print corresponding to said print data is formed;
an actual medium specification information acquisition process for acquiring actual medium specification information of said print-receiving medium fed by said feeder at a time of production of said printed matter in said printed-matter production process, the actual medium specification information being acquired after and separately from acquiring the one piece of medium specification information in the medium specification information acquisition process;
a matching determination process for determining a matching degree between the one piece of medium specification information stored in said medium specification information storage memory and used at the time of production of said printed matter in said printed-matter production process, and said actual medium specification information acquired in said actual medium specification information acquisition process; and
a medium specification information replacement process for replacing the one piece of said medium specification information used for producing said printed matter with one piece of medium specification information satisfying a predetermined condition among the plural pieces of medium specification information stored in said medium specification information storage memory in accordance with the matching degree determined in said matching determination process.

7. The printed-matter producing apparatus according to claim 6, wherein said controller is further configured to execute a failure detection process of detecting a printing failure occurring due to at least one setting of the set of various pieces of setting information of the one piece of medium specification information being incorrect, and
wherein the actual medium specification information acquisition process is performed after detecting the printing failure.

* * * * *